S. J. BOLTON & J. JOHNSON.
Shovels
No. 154,012.  Patented Aug. 11, 1874.
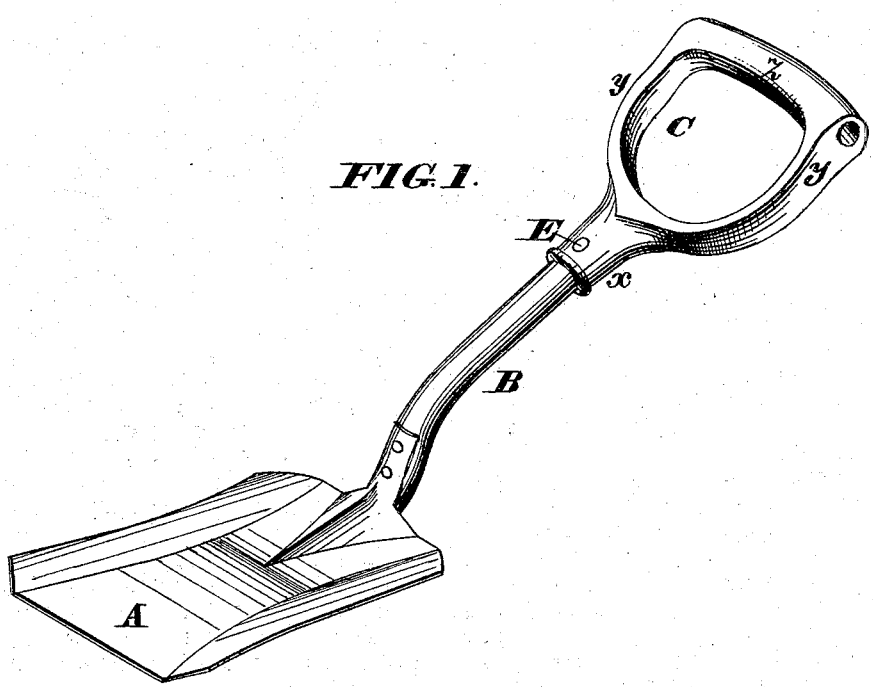
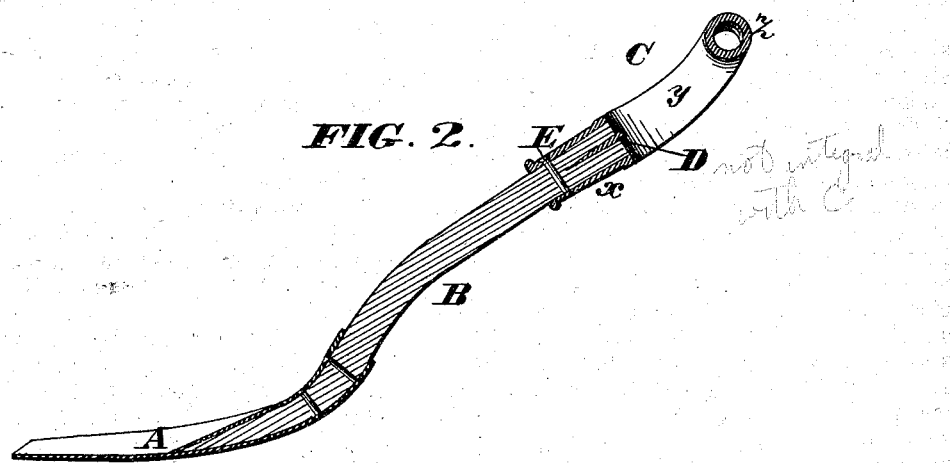
WITNESSES
Jas L. Ewin
Walter Allen
INVENTORS
Samuel J. Bolton.
John Johnson.
By Knight Bro.
Attorneys

UNITED STATES PATENT OFFICE.

SAMUEL J. BOLTON AND JOHN JOHNSON, OF MEMPHIS, TENNESSEE.

IMPROVEMENT IN SHOVELS.

Specification forming part of Letters Patent No. 154,012, dated August 11, 1874; application filed July 18, 1874.

*To all whom it may concern:*

Be it known that we, SAMUEL J. BOLTON and JOHN JOHNSON, both of the city of Memphis and county of Shelby, in the State of Tennessee, have jointly invented a new and useful Improvement in Shovel-Handles, of which the following is a specification:

The primary objects of this invention are the adaptation of ordinary hand-shovels for use as tamping-bars in building railways, and in similar work, and the adaptation of ordinary shovels thus used to be easily and quickly repaired.

The invention consists in a metallic handle, cast in one piece, with a hollow grasp-bar, and curved to adapt it for tamping under railway cross-ties, and in similar locations, and to facilitate securing the handle to an ordinary wooden shank by means of a longitudinal wedge, which is used in connection with a rearwardly-flaring neck-socket and a transverse rivet, as hereinafter set forth.

In the accompanying drawing, Figure 1 is a perspective view of a tamping-shovel illustrating this invention. Fig. 2 is a longitudinal section of the same.

The blade or scoop A of the improved shovel, and the wooden handle shank or stem B, may be of any common or preferred make.

The handle C, to which this invention relates, consists of a single casting, preferably of malleable iron. The grasp-bar or end $z$ is made hollow by coring, so as to render it both strong and light, and is united at each end by a curved side bar, $y$, to a central longitudinal neck, $x$, the interior of which is of sufficient size to receive the end of the wooden shank B, and flares rearwardly to provide for spreading the same within the neck. This is accomplished by inserting a longitudinal wedge, D, as illustrated in Fig. 2, and the shank or stem is further secured by a transverse rivet, E, at the front end of the neck.

In the tamping process on railways—that is, in compacting the earth or gravel under and around the cross-ties—laborers generally adopt the plan of reversing the shovel, and using the handle as a tamper, rather than to drop the shovel and take a tamping-bar for this purpose, and considerable time is thus saved; but shovels which are otherwise good are quickly rendered useless by having their handles broken in this way.

Shovels especially adapted for this use have been designed, but none of them, so far as known, have fully met the requirements.

One primary object of the present invention, as before stated, is to furnish a cheap shovel for this work, which is not liable to be broken in use, and which is adapted to be readily and quickly repaired, when this is required.

The cast-iron handle in one piece possesses all necessary strength, and is at the same time light and permanently smooth.

The fastening devices are simple, and should the handle or the wooden shank of an ordinary shovel be broken, the laborer can readily apply a metallic handle and secure it so as to resume work in a very short time.

To adapt the handle in a very superior degree for tamping under cross-ties, and in similar places, it is curved upward, as represented in Fig. 2, so as to bring the grasp-bar $z$ of the handle, or the center thereof, at or above the line of the top of the wooden shank. This serves also to facilitate driving the fastening-wedge D, as before stated.

The handle C is preferably made of malleable cast-iron, but may be made of other metal, if desired. The shank B and wedge D are preferably wooden, the locking-rivet E of iron or copper, and the blade or scoop A of sheet iron or steel.

The following is claimed as new in this invention, namely:

1. A metallic handle, C, for shovels, cast in one piece, and having a hollow grasp-bar, $z$, side bars $y$, and a central longitudinal neck, $x$, substantially as herein shown and described.

2. The metallic handle C, having a longitudinal neck, $x$, with rearwardly-flaring interior, in combination with the wedge D and transverse rivet E, for attaching the same to an ordinary wooden shank or stem, B, substantially as specified.

3. The metallic shovel-handle C, curved upwardly, as shown and described, to adapt the same for tamping beneath railway cross-ties, and in similar places, as set forth.

S. J. BOLTON.
JOHN JOHNSON.

Witnesses:
J. W. HEATH,
C. W. HOFFMAN.